United States Patent
Jech et al.

(10) Patent No.: US 10,473,156 B2
(45) Date of Patent: Nov. 12, 2019

(54) SLEEVE-LIKE BEARING RECEIVING MEMBER FOR A PLASTICS MATERIAL SLEEVE

(71) Applicant: Benteler Automobiltechnik GmbH, Paderborn (DE)

(72) Inventors: Martin Jech, Bily Kostel nad Nisou (CZ); Milan Satorie, Liberec (CZ); Rostislav Zavacky, Straz nad Nisou (CZ); Peter Michael Stastny, Delbrueck (DE); Markus Kirsch, Paderborn (DE)

(73) Assignee: Benteler Automobiltechnik GmbH, Paderborn (DE)

( * ) Notice: Subject to any disclaimer, the term of this patent is extended or adjusted under 35 U.S.C. 154(b) by 37 days.

(21) Appl. No.: 15/837,739

(22) Filed: Dec. 11, 2017

(65) Prior Publication Data
US 2018/0172070 A1 Jun. 21, 2018

(30) Foreign Application Priority Data
Dec. 16, 2016 (DE) .................. 10 2016 124 699

(51) Int. Cl.
*F16C 29/02* (2006.01)
*F16C 33/20* (2006.01)

(52) U.S. Cl.
CPC .............. *F16C 29/02* (2013.01); *F16C 33/20* (2013.01)

(58) Field of Classification Search
CPC ...... F16F 1/02; F16F 1/38; F16F 1/387; F16F 1/3732; F16F 1/3842; F16F 1/3863; F16F 1/3814; F16C 29/02; F16C 33/20; F16C 33/22; F16C 33/205; F16C 33/208; F16C 2220/84; F16C 2226/50
USPC ......................................... 267/293, 220, 195
See application file for complete search history.

(56) References Cited

U.S. PATENT DOCUMENTS

| | | | | |
|---|---|---|---|---|
| 1,597,428 A | * | 8/1926 | Brincil | B21K 1/04 384/284 |
| 3,157,444 A | * | 11/1964 | Scheel | F16C 33/20 384/291 |
| 2004/0206573 A1 | * | 10/2004 | Hsu | F01N 1/24 181/228 |

(Continued)

FOREIGN PATENT DOCUMENTS

DE       101 60 840 C1    8/2003
DE   10 2009 034 337 A1   1/2011

(Continued)

*Primary Examiner* — Robert A. Siconolfi
*Assistant Examiner* — San M Aung
(74) *Attorney, Agent, or Firm* — Holland & Hart LLP

(57) ABSTRACT

The disclosure relates to a sleeve-like bearing receiving member for a plastics material sleeve, wherein the sleeve-like bearing receiving member may include a cylindrical sleeve wall that delimits the inner side of the sleeve-like bearing receiving member, wherein a plurality of apertures are formed in the cylindrical sleeve wall, wherein each aperture of the plurality of apertures is at least partially bordered by a collar that protrudes into the inner side of the sleeve-like bearing receiving member, and wherein the collar is configured to engage in the plastics material sleeve to retain the plastics material sleeve in the sleeve-like bearing receiving member.

18 Claims, 2 Drawing Sheets

(56) References Cited

U.S. PATENT DOCUMENTS

| | | | |
|---|---|---|---|
| 2010/0230877 A1* | 9/2010 | Schudt | F16F 1/377 267/220 |
| 2012/0098178 A1* | 4/2012 | Yahata | F16F 1/3842 267/141.2 |
| 2015/0028644 A1 | 1/2015 | Hagan et al. | |
| 2016/0105013 A1* | 4/2016 | Fulponi | H02G 15/043 174/77 R |

FOREIGN PATENT DOCUMENTS

| | | | |
|---|---|---|---|
| GB | 1 078 641 A | | 8/1967 |
| JP | H08-296 679 A | | 11/1996 |
| JP | 2013204726 A | * | 10/2013 |

* cited by examiner

SLEEVE-LIKE BEARING RECEIVING MEMBER FOR A PLASTICS MATERIAL SLEEVE

CROSS-REFERENCE TO RELATED APPLICATIONS

This application claims priority to German patent application No. 10 2016 124 699.9, entitled "Hülsenförmige Lageraufnahme für eine Kunststoffhülse", and filed on Dec. 16, 2016 by the assignee of this application, the entire disclosure of which is incorporated by reference for all purposes.

BACKGROUND

The present disclosure relates to a sleeve-like bearing receiving member for a plastics material sleeve, in particular for an elastomer bearing in a plastics material sleeve.

In order to retain plastics material sleeves which retain elastomer bearings, there may, for example, be provided metal sleeves in which the plastics material sleeves are pressed. The retention of the plastics material sleeve by the sleeve-like bearing receiving member may be produced by means of a positive-locking closure between the plastics material sleeve and sleeve-like bearing receiving member. In order to increase the friction coefficient between the plastics material sleeve and sleeve-like bearing receiving member, a knurling may be formed, for example, on the inner side of the sleeve-like bearing receiving member. This formation may require an additional operating step so that the production time and production costs are significantly increased.

SUMMARY

An object of the present disclosure is to provide a more cost-effective concept for increasing a force transmission of a mechanical connection, in particular for receiving a plastics material sleeve by means of a sleeve-like bearing receiving member.

This object is achieved by the features of the independent claims. Advantageous examples of the disclosure are set out in the dependent claims, the description and the appended drawings.

The disclosure is based on the recognition that the above objective can be achieved by a sleeve-like bearing receiving member which is formed by means of a sleeve with openings or apertures which are distributed over the periphery. In order to increase a friction coefficient, there are provided on the inner side of the sleeve collars which each border an opening. The apertures and the collars can be produced in a cost-effective manner in one operating step by means of a punching operation, wherein the collars are formed by punching burrs. The positive-locking connection between the sleeve-like bearing receiving member and the plastics material sleeve may further be improved by the relaxation of the material of the plastics material sleeve around the collars and in the openings.

According to a first aspect, the disclosure relates to a sleeve-like bearing receiving member for a plastics material sleeve, wherein the sleeve-like bearing receiving member has a cylindrical sleeve wall which delimits the inner side of the sleeve-like bearing receiving member, wherein a plurality of apertures are formed in the cylindrical sleeve wall, wherein each aperture is at least partially bordered by a collar which protrudes into the inner side of the sleeve-like bearing receiving member, and wherein the collars are configured to engage in the plastics material sleeve in order to retain the plastics material sleeve in the sleeve-like bearing receiving member.

As a result of the plurality of apertures in the cylindrical sleeve wall, a particularly advantageous weight saving is achieved. Furthermore, the material of the plastics material sleeve can relax into the openings, which further promotes the positive-locking connection between the plastics material sleeve and the sleeve-like bearing receiving member.

In an advantageous example of the sleeve-like bearing receiving member, the apertures are punched apertures, wherein the collars are formed by punching burrs. During the punching of the sheet metal bar piece which in a subsequent production step forms the sleeve-like bearing receiving member, the punched apertures and punching burrs which form the collars can be formed at the same time so that no additional operating step is required to form the punching burrs.

In an advantageous example, the sleeve-like bearing receiving member is formed by a clinched bar piece, in particular a sheet metal bar piece. The sleeve-like bearing receiving member can thereby be produced in a particularly cost-effective manner. The apertures and the collars can be produced before the clinching or after the clinching of the sheet metal bar piece.

In an advantageous example, the apertures of the sleeve-like bearing receiving member are formed over a periphery of the cylindrical sleeve wall.

In an advantageous example, the apertures of the sleeve-like bearing receiving member are arranged over a periphery of the cylindrical sleeve wall along a periodic grid.

In an advantageous example, the apertures of the sleeve-like bearing receiving member have the same diameter within a tolerance range. The deviation from the desired value of the diameter is, for example, below 5%.

In an advantageous example, the diameter of the apertures is smaller than the diameter of the sleeve-like bearing receiving member. The smaller the diameter of the apertures in relation to the diameter of the sleeve-like bearing receiving member, the more apertures can be formed on the cylindrical sleeve wall, wherein the collar length, totaled over all the apertures, also increases. This can contribute to the increase of the friction coefficient between the cylindrical sleeve wall and the plastics material sleeve.

In an advantageous example, there is formed in the cylindrical sleeve wall of the sleeve-like bearing receiving member another aperture whose diameter is greater than a diameter of an aperture of the plurality of apertures.

According to a second aspect, the disclosure relates to a bearing arrangement for a vehicle, having a resilient bearing which is arranged in a plastics material sleeve, and the sleeve-like bearing receiving member according to the first aspect and/or the associated advantageous examples, wherein the plastics material sleeve is arranged in the sleeve-like bearing receiving member.

In an advantageous example of the bearing arrangement, the plastics material sleeve is pressed into the sleeve-like bearing receiving member. In this manner, the positive-locking connection between the plastics material sleeve and the bearing arrangement can be produced in a particularly simple manner.

In an advantageous example of the bearing arrangement, the resilient bearing is an elastomer bearing or a rubber bearing.

According to a third aspect, the disclosure relates to a method for producing a bearing arrangement, having: provision of a bar piece, in particular a sheet metal bar piece;

formation of a plurality of apertures in the bar piece in order to obtain a perforated semi-finished product, wherein in the step of forming the plurality of aperture collars are formed, wherein each collar at least partially borders an aperture and is orientated in such a manner that the collar after the subsequent shaping operation protrudes into the inner side of the sleeve-like bearing receiving member; shaping the perforated semi-finished product to form a sleeve-like bearing receiving member; and pressing a resilient bearing, in particular a rubber bearing or an elastomer bearing which is arranged in a plastics material sleeve, into the sleeve-like bearing receiving member in order to obtain the bearing arrangement.

In an advantageous example of the method for producing a bearing arrangement, in particular the bearing arrangement according to the first aspect, the shaping of the perforated semi-finished product involves clinching the perforated semi-finished product. The planar, perforated semi-finished product is thereby converted into a cylindrical shape and the ends of the perforated semi-finished product are connected in a positive-locking manner. The production of a steel sleeve by clinching is a cost-effective method compared with other methods.

Other features of the method will be appreciated directly from the features of the bearing arrangement according to the first aspect.

BRIEF DESCRIPTION OF THE DRAWINGS

Examples of the principles of this disclosure are explained in greater detail with reference to the appended drawings.

DETAILED DESCRIPTION OF THE DRAWINGS

Figure 1:
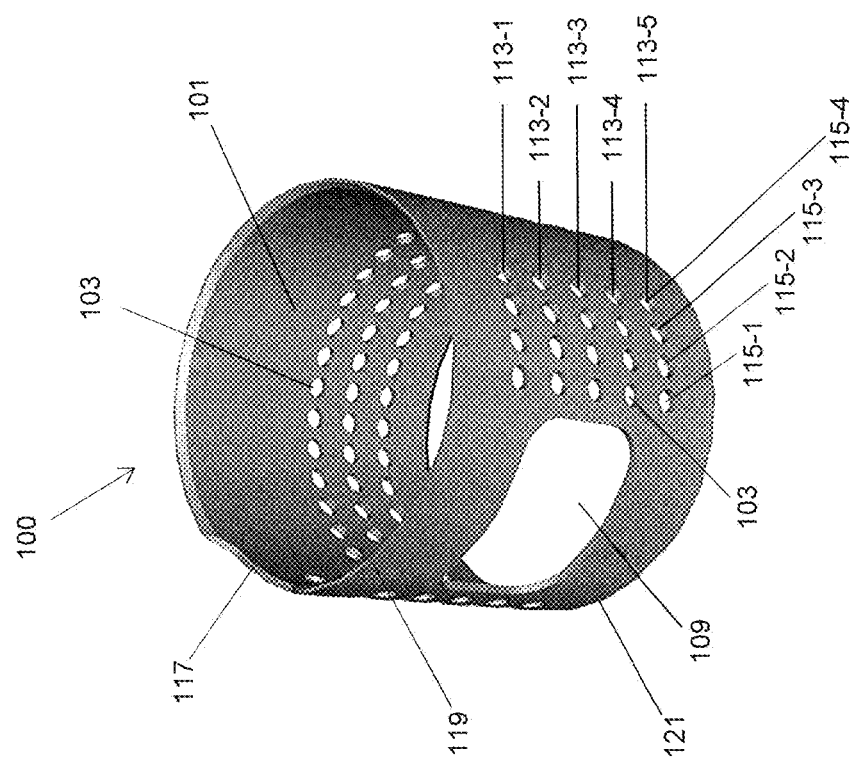
FIG. 1 shows a sleeve-like bearing receiving member according to an example.

FIG. 1 is a schematic illustration of a sleeve-like bearing receiving member 100 with a cylindrical sleeve wall 101 for receiving a plastics material sleeve 105 with a plurality of apertures 103. Furthermore, there is provided an aperture 109 which has a larger diameter than a diameter of the plurality of apertures 103.

In an advantageous example, the plurality of apertures 103 may be formed in a circular manner and/or be arranged with a fixed spacing along a diameter of the sleeve-like bearing receiving member 100.

The apertures 103 may be configured in several rows 113-1 to 113-5 and columns 115-1 to 115-4 along the cylindrical sleeve wall 101 so that a, for example, regular rectangular grid of apertures 103 is produced. The grid may, however, also be irregular.

The rows 113-1 to 113-5 of the apertures 103 may have a smaller spacing with respect to each other than with respect to the edges 119, 121 of the sleeve-like bearing receiving member 100.

In an advantageous example, the plurality of apertures 103 may form a regular, hexagonal grid along the cylindrical sleeve wall 101.

In an advantageous example, the apertures 103 may be formed in an irregular manner.

In an advantageous example, the plurality of apertures 103 may be subdivided into groups which in comparison with the spacing of the apertures 103 within a group, have a greater spacing between the groups.

In an advantageous example, one of the edges 119, 121 of the sleeve-like bearing receiving member 100 may be interrupted by a recess 117.

In an advantageous example, the plurality of apertures 103 are arranged in such a manner that there is no intersection between the apertures 103 and the edges 119, 121 of the sleeve-like bearing receiving member 100.

Figure 2:
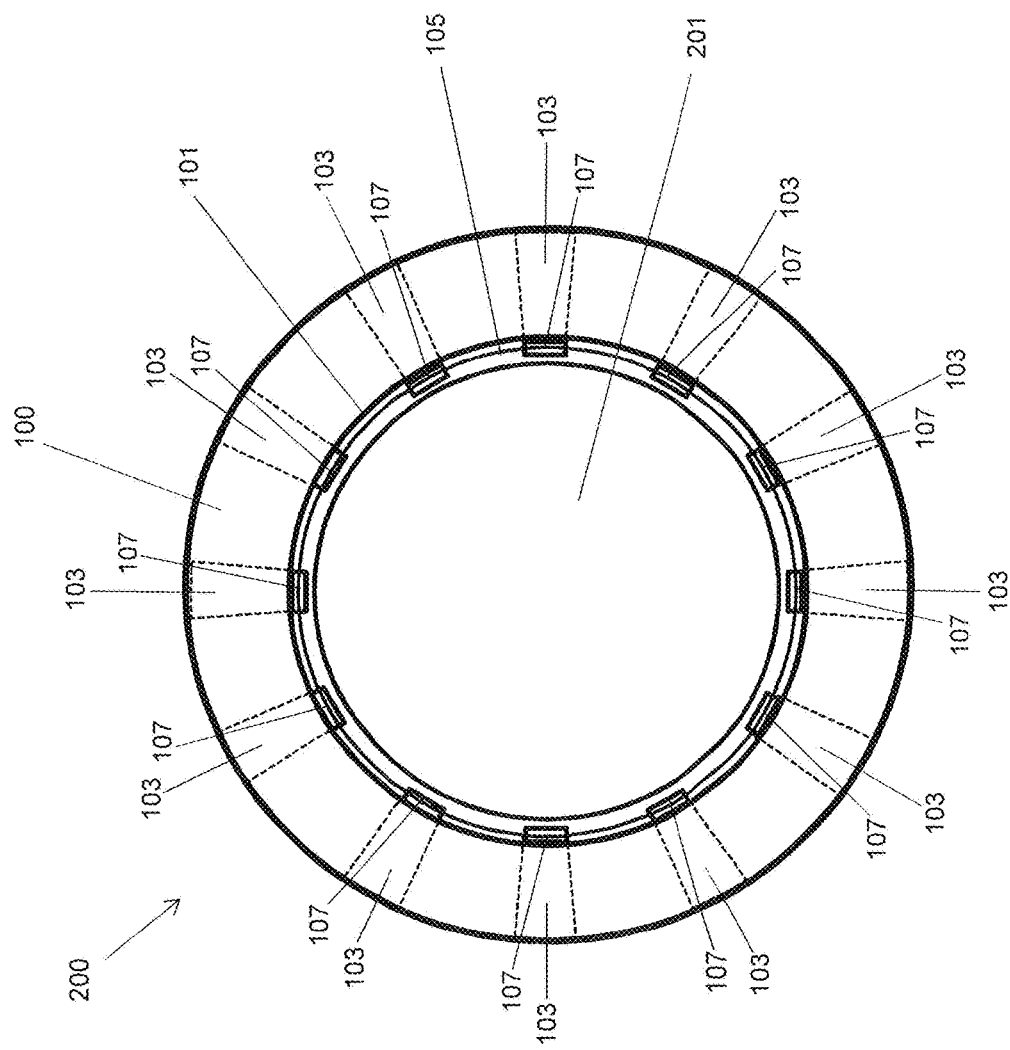
FIG. 2 is a view of a sleeve-like bearing receiving member according to an example.

FIG. 2 is a schematic illustration of the bearing arrangement 200, formed by a sleeve-like bearing receiving member 100 with a cylindrical sleeve wall 101 which has a plurality of apertures 103, wherein there are configured at the apertures 103 collars 107 which engage in the plastics material sleeve 105 of the resilient bearing 201.

The plurality of apertures 103 is, for example, formed by means of a punching tool. This can be carried out in an operating step with the punching of the basic shape of the sheet metal bar piece.

Each aperture 103 is in this instance at least partially bordered by a collar 107 which protrudes into the inner side of the sleeve-like bearing receiving member 100. The plurality of collars 107 are marked by way of example by a selection. The positive-locking connection between the sleeve-like bearing receiving member 100 and plastics material sleeve 105 is preferably brought about by pressing the plastics material sleeve 105 into the sleeve-like bearing receiving member 100. This can be carried out using a pressing tool.

The collars 107 can after the pressing of the plastics material sleeve 105 engage in a positive-locking manner in the plastics material sleeve 105 and increase the retention between the plastics material sleeve 105 and sleeve-like receiving member 100.

In an advantageous example, the resilient bearing 201 may terminate in a positive-locking manner with the edge 119 and/or the edge 121 of the sleeve-like bearing receiving member 100.

In an advantageous example, there is a spacing between the termination of the resilient bearing 105 and the edges 119, 121 of the sleeve-like bearing receiving member 100.

The plastics material sleeve 105 often comprises plastics material for cost reasons. According to an advantageous example, the plastics material sleeve can be replaced by a metal sleeve.

The sleeve-like bearing receiving member may be part of a chassis component.

LIST OF REFERENCE NUMBERS

100 Sleeve-like bearing receiving member
101 Cylindrical sleeve wall
103 Plurality of apertures
105 Plastics material sleeve
107 Collar
109 Single relatively large aperture
113-1 to 113-5 Arrangement of apertures
115-1 to 115-4 Arrangement of apertures
117 Recess
119 Edge
121 Edge
200 Bearing arrangement
201 Resilient bearing

What is claimed is:

1. A bearing receiving member for a plastics material sleeve, comprising:
   a cylindrical sleeve wall that delimits the inner side of the bearing receiving member; and a plurality of apertures formed in the cylindrical sleeve wall, wherein each aperture of the plurality of apertures is at least partially bordered by a collar that protrudes into the inner side of the bearing receiving member, and wherein the collar is configured to engage in the plastics material sleeve to retain the plastics material sleeve in the bearing receiving member; and an additional aperture formed in the cylindrical sleeve wall, wherein a diameter of the additional aperture is greater than a diameter of each of the apertures of the plurality of apertures.

2. The bearing receiving member according to claim 1, wherein the plurality of apertures are punched apertures, and wherein the collar is formed by punching burrs.

3. The bearing receiving member according to claim 1, wherein the bearing receiving member is formed by a clinched bar piece.

4. The bearing receiving member according to claim 3, wherein the clinched bar piece is a sheet metal bar piece.

5. The bearing receiving member according to claim 1, wherein the plurality of apertures are formed over a periphery of the cylindrical sleeve wall.

6. The bearing receiving member according to claim 1, wherein the plurality of apertures are arranged over a periphery of the cylindrical sleeve wall along a periodic grid.

7. The bearing receiving member according to claim 1, wherein the diameter of each of the apertures of the plurality of apertures is the same within a tolerance range.

8. The bearing receiving member according to claim 1, wherein the diameter of each of the apertures of the plurality of apertures is smaller than the diameter of the bearing receiving member.

9. A bearing arrangement for a vehicle, comprising:
a resilient bearing arranged in a plastics material sleeve; and
a bearing receiving member comprising:
a cylindrical sleeve wall that delimits the inner side of the bearing receiving member; and
a plurality of apertures formed in the cylindrical sleeve wall, wherein each aperture of the plurality of apertures is at least partially bordered by a collar that protrudes into the inner side of the bearing receiving member, and wherein the collar is configured to engage in the plastics material sleeve to retain the plastics material sleeve in the bearing receiving member;

an additional aperture formed in the cylindrical sleeve wall, wherein a diameter of the additional aperture is greater than a diameter of each of the apertures of the plurality of apertures wherein the plastics material sleeve is arranged in the bearing receiving member.

10. The bearing arrangement according to claim 9, wherein the plastics material sleeve is pressed into the bearing receiving member.

11. The bearing arrangement according to claim 9, wherein the resilient bearing is an elastomer bearing or a rubber bearing.

12. A method for producing a bearing arrangement, comprising:
provisioning a bar piece;
forming a plurality of apertures and a plurality of collars in the bar piece to obtain a perforated semi-finished product, wherein each collar of the plurality of collars at least partially borders an aperture of the plurality of apertures;
forming an additional aperture in a cylindrical sleeve wall of the bearing receiving member, wherein a diameter of the additional aperture is greater than a diameter of each of the apertures of the plurality of apertures;
shaping the perforated semi-finished product to form a bearing receiving member, wherein after shaping, each collar of the plurality of collars protrudes into the inner side of the bearing receiving member; and
pressing a resilient bearing into the bearing receiving member to obtain the bearing arrangement.

13. The method according to claim 12, wherein the shaping of the perforated semi-finished product involves clinching the perforated semi-finished product.

14. The method according to claim 12, wherein the bar piece is a sheet metal bar piece.

15. The method according to claim 12, wherein the resilient bearing is a rubber bearing or an elastomer bearing arranged in a plastics material sleeve.

16. The method according to claim 12, wherein the plurality of apertures are formed over a periphery of a cylindrical sleeve wall of the bearing receiving member.

17. The method according to claim 12, wherein the plurality of apertures are arranged over a periphery of a cylindrical sleeve wall of the bearing receiving member along a periodic grid.

18. The method according to claim 12, wherein the diameter of each of the apertures of the plurality of apertures is the same within a tolerance range.

* * * * *